(12) United States Patent
Abuaf (10) Patent No.: US 8,219,471 B2
(45) Date of Patent: Jul. 10, 2012

(54) REAL ESTATE APPRECIATION CONTRACT

(76) Inventor: Alvi Abuaf, New York, NY (US)

( * ) Notice: Subject to any disclaimer, the term of this patent is extended or adjusted under 35 U.S.C. 154(b) by 737 days.

(21) Appl. No.: 12/167,727

(22) Filed: Jul. 3, 2008

(65) Prior Publication Data

US 2009/0037328 A1 Feb. 5, 2009

Related U.S. Application Data (60) Provisional application No. 60/948,103, filed on Jul. 5, 2007.

(51) Int. Cl.
*G06Q 40/00* (2012.01)
(52) U.S. Cl. .......................... 705/35; 705/36 R; 705/38
(58) Field of Classification Search .................. 705/35, 705/36 R, 38
See application file for complete search history.

(56) References Cited

U.S. PATENT DOCUMENTS

| | | | |
|---|---|---|---|
| 5,983,206 A * | 11/1999 | Oppenheimer | 705/38 |
| 5,987,435 A * | 11/1999 | Weiss et al. | 705/36 R |
| 7,822,668 B1 * | 10/2010 | Benda | 705/36 R |
| 2005/0108123 A1 * | 5/2005 | Schneider | 705/35 |
| 2006/0129469 A1 * | 6/2006 | Schmidlin | 705/35 |
| 2006/0190278 A1 * | 8/2006 | Zimmerman et al. | 705/1 |
| 2006/0248001 A1 * | 11/2006 | Graeve et al. | 705/38 |
| 2007/0299753 A1 * | 12/2007 | Averbuch et al. | 705/35 |
| 2008/0162336 A1 * | 7/2008 | Jaffee | 705/38 |
| 2009/0234763 A1 * | 9/2009 | Stenson et al. | 705/35 |

OTHER PUBLICATIONS

Credit card access to home equity lines does not increase usage Anonymous. Community Banker. Washington: Nov. 2003. vol. 12, Iss. 11; p. 76.*
Cash: Key to a happy retirement: :Unlock a retirement fund: Releasing equity from your home may provide financial security for your retirement Neasa MacErlean. The Observer. London (UK): Jul. 27, 2003. p. 3.*

* cited by examiner

*Primary Examiner* — Lalita M Hamilton
(74) *Attorney, Agent, or Firm* — Leason Ellis LLP.

(57) ABSTRACT

A method and system for providing a contract between a property purchaser, e.g., the purchaser of a house, co-op or condo, and an investment fund in which a down payment or other financing is provided to the buyer from the fund in return for a portion of the capital appreciation of the real estate asset. The contract may be grouped with other such contracts and traded in an electronic market. Upon maturity or earlier sale of the property, a portion of the appreciated value of the property paid back to the Fund.

29 Claims, 4 Drawing Sheets

Investment Decision

REAL ESTATE APPRECIATION CONTRACT

This application claims the benefit of U.S. Provisional Application No. 60/948,103, filed Jul. 5, 2007, the entire contents of which are hereby incorporated by reference.

BACKGROUND OF THE INVENTION

1. Field of the Invention

The invention generally relates to the field of finance and, more particularly, to a system and method for trading in the appreciation of real estate both (a) with the purchaser or owner of the real estate in return for funds towards a down payment or to take cash out of equity in a property through a refinancing and (b) in a market for rights to the appreciation.

2. Description of the Related Art

In the purchase of residential real estate, single family homes, condominiums and cooperative apartments, it is well known that the greatest hurdle for first time buyers is the down payment. Thus, buyers able to carry a mortgage, pay real estate taxes, and/or pay common charges, may have to wait several years while they save a down payment. During this period of time the property in which they are interested may, and usually does, appreciate in value. However, these buyers cannot participate in this appreciation unless they can get a loan to cover the down payment. However, some financial institutions will not issue a mortgage where the buyer has to borrow the down payment. In addition, the payments on the loan for the down payment put a strain on the finances of the buyer. Thus, it would be beneficial to first time buyers, or buyers with limited sums available for down payments, if they could trade something of value for the down payment, and not have to repay the down payment through current payments of principal and interest or some balloon payment at a fixed point in time.

Current owners of homes and condos may wish to cash in on some of the appreciation they have experienced while still remaining in their properties. It would be beneficial for such owners to recover some of this appreciation by sharing their future appreciation without incurring additional monthly payments or adding loans to their credit status.

Real estate speculators purchase properties in a rising market, not to live in the residence, but to resell it for a profit in a short period of time. However, the amount of property that can be invested in is limited by the speculator's available capital. Further, the speculator must risk his investment in particular pieces of property which may not appreciate, even in a rising market. It would be beneficial to the speculator if he could spread his risk over a number of pieces of property and share the risk with others. Currently such investors have to take on the burdens of ownership and managing the rental of their property; a particularly burdensome process, particularly for overseas investors who may wish to leverage their currently strong currency.

SUMMARY OF THE INVENTION

The present invention can be directed to a contract between a property purchaser or property owner, e.g., the purchaser or owner of a house, co-op or condo, and an investment fund ("Fund") in which a down payment or other financing can be provided to the buyer from the fund in return for a portion of the capital appreciation of the real estate asset. An existing property owner has the opportunity to monetize at least a portion of the appreciation they have experienced on their property.

In an illustrative embodiment of the invention, the Fund provides up to 20% of the value of the real estate. This funding may be in the form of a down payment at the time of purchase or as a payment to the owner with an appreciated unit (similar to a home equity line of credit). In return for providing the funding, the Fund receives a portion of the real estate appreciation. This is not a loan, it is a simple contract.

The contract can be for a fixed period of time, e.g., 10 years; however, the owner can be given the right to terminate the contract at any time or after a certain minimum period of time, e.g., after 2 years, by satisfying the Fund's financing obligations. The financing may also be extended beyond the basic term with the approval of the Fund; but, in this circumstance the Fund may require that its investment be amortized and it may make interest and other charges, e.g., it could charge an interest rate equal to a 5 year note plus 3.0% margin on the investment amount plus its profit share based on the ending value.

When the contract is to be ended, the Owner's obligation may be settled by refinancing with a loan. Thus, the property does not have to be sold for the Fund to realize a gain.

The Fund does not assume any financial responsibility beyond the amount of its investment. Other mortgage companies or banks provide an amortizing mortgage for the remaining portion of the purchase price (first mortgage). Of course, the holder of the first mortgage must be an entity that does not object to the option agreement contract between the owner and the Fund.

The buyer does not have any financial exposure to the Fund investment. That investment can be secured by the underlying real estate asset only. The buyer retains the benefit of deducting all interest on the first mortgage and any real estate taxes from his or her personal income taxes.

The risk for the Fund is that the real estate asset may not appreciate in value. Thus, this type of investment may be most attractive in rising markets. In effect, the Fund can be an investment that seeks to provide high, long-term capital gain returns by building a portfolio of real estate investments that are mortgaged by their owners and a portion of whose appreciation is realized by the Fund. In essence the Fund can own a portion of the appreciation of the underlying real estate. Thus, the Fund can provide the money for part (or all) of the equity required to purchase or refinance real estate at low (or 0%) interest rates; in return the fund owns a portion (or all) of the appreciation of the property. The funds can be provided for a limited time frame for each property, at the end of which the property is either (a) "marked to market" and refinanced by the owner or (b) sold or turned over to the Fund.

BRIEF DESCRIPTION OF THE DRAWINGS

The foregoing and other advantages and features of the invention will become more apparent from the detailed description of the exemplary embodiments of the invention given below with reference to the accompanying drawings in which.

DETAILED DESCRIPTION OF AN EXEMPLARY EMBODIMENT

The present invention relates to a system and method for allowing investors to share in the appreciation of real estate along with the purchaser. The legal basis for the system is a contract between the purchaser and an investment fund (the "Fund") in which the investor participates. Under the contract the Fund can provide financing toward the real estate purchase, e.g., funds towards a down payment, in return for rights to a portion of the appreciation in the value of the real estate.

In a market where there is substantial appreciation in real estate values, the Fund can make a profit that exceeds the interest on a loan. For example, assume money is needed to provide a 10% down payment toward the purchase of a $100,000 piece of property. The $10,000 down payment can be obtained by a second mortgage on the property at a 6% annual interest rate, while the remainder of the purchase price is provided by a first mortgage. At the end of the year the holder of the second mortgage would earn $600 in interest. In 5 years the holder of the second mortgage would have received $3,000 in simple interest. If in the market where the property is located, it appreciates by 10% in a year, the value of the appreciation in five years simply calculated would be $50,000. As a result, if the Fund providing the down payment under a contract according to the present invention is entitled to 60% of the appreciation, the Fund would have earned $30,000, as opposed to the $3,000 it would have received by providing a second mortgage.

Naturally the loan is more secure, since it is backed by the second mortgage. The risk is increased further because the owner pays no interest during the term of the investment and, if the property does not appreciate, the fund gets no return on its investment. However, the return under the contract is great enough to induce the Fund to accept the risk. Further, the Fund can take steps to insure a return by (a) only entering contracts in appreciating markets, (b) adjusting the percentage of appreciation the Fund is entitled to receive under the contract, and (c) limiting the time period for the contract, i.e., requiring the purchaser to liquidate the Fund's share of the appreciation in a period of time. The Fund also has the advantage that it can participate in an appreciating real estate market with a fraction of the capital necessary to actually purchase real estate in the market, i.e., it puts up only the down payment, but gets a percentage of the appreciation that is a larger percentage of the total cost than is the down payment. The Fund can also mitigate its risk by spreading its capital over a large number of properties in different markets. Thus, while the invention includes a single contract between a buyer and a provider of funds for a down payment, it also includes multiple contracts financed by a fund in which numerous investors participate. The invention also contemplates that investor participation may be traded to provide liquidity to the individual investor. The contracts may be pooled and sliced by risk category to be traded in the secondary market.

Naturally a purchaser of property would typically participate in a contract according to the invention only where he or she have limited capital and want a home in which to live or want to monetize appreciation to date. However, a purchaser might also want to participate in such a contract where he or she had insufficient capital to make a purchase in the market or make a purchase at a particular price level, but wanted to participate in the appreciation going on in the market at that level. It frequently happens that appreciation in the market is by segments, so low priced houses or condos may not be appreciating while high priced property has significant appreciation, but requires much more capital. A purchaser, which may be an individual or an investment company itself, may also want to participate in the contract to spread the risk of the overall purchase to investors in return for a portion of the expected profits.

Another benefit to the purchaser are that there are no second mortgage interest payments to make, thus preserving cash. Further, after the purchase, the new owner retains the benefit of deducting from personal income taxes all of the interest on the first mortgage and any real estate taxes.

Banks and other prime lending institutions may have a concern if the purchaser were to utilize the contract and did not have the income to carry the financial obligation for the property. Thus, the contract is not available as a sub-prime lending vehicle; owners must have a good credit rating and must qualify. The Fund will utilize the credit approval process of the first mortgage holder, thereby avoiding the cost of doing an independent appraisal. However, some purchasers, especially young people, have sufficient income, but have not had the time to save the money for a down payment. Thus, they are trying to save at the same time the market is appreciating and making the necessary down payment even larger. The use of the funds provided by the Fund may also help the first-time buyer both qualify for the mortgage and meet the condo's approval process. In such a case, the contract allows the purchaser to get into the market and to use the appreciation as a form of down payment. In any event, the provider of the first mortgage must be made aware of the contract and approve its use.

Banks may have an incentive to approve mortgages in which a part or all of the down payment is a result of the contract according to the invention. Because the Fund now has an interest in the property, it may take steps to protect against default by the owner as a means of preserving its interest. This provides additional protection to the bank.

In a typical scenario the Fund can provide up to 20% of the value of a condo unit. This funding may be in the form of a down payment at the time of purchase or as a payment to the owner with an appreciated unit (similar to a home equity line of credit). In return for providing the funding, the Fund receives a portion of the real estate appreciation. It is important to note that the vehicle for the financing is not a loan; it is a simple contract with a fixed period of time, e.g., 10 years. The Fund does not assume any further financial responsibility beyond the amount of its investment. Other mortgage companies or banks provide an amortizing mortgage for the remaining portion of the purchase price (first mortgage). The owner does not have any financial exposure for the Fund investment. That investment is secured only by the contract to participate in the appreciation in the value of the underlying real estate asset.

While it is envisioned that the contract would be for a fixed period of time, the owner could be provided under the contract with the right to exit the agreement at any time after the Fund has received a return on its investment, e.g., after a minimum of 2 years, by satisfying the financing obligations. Once the owner has properly terminated the contract, he or she receives 100% of future appreciation.

As an alternative to early termination, the contract may be extended beyond 10 years with the approval of the Fund. For example, if after 10 years the market in the area is still appreciating, the Fund may still find the contract lucrative, and the owner may have other more profitable uses for his or her money. In such a case the Fund may require its investment to be amortized and could make interest and other charges. For example, the Fund could charge the 5 year note interest rate plus 3.0% margin on the investment amount plus its profit share based on the ending value of the property.

The contract may be settled by refinancing at the end of the term or at any time after the minimum period. Thus, the property does not have to be sold for the Fund to realize its share of the appreciation.

It should be noted that the contract does not guarantee that the real estate asset will appreciate in value. Rather, the Fund is making the investment based on its informed belief that there will be appreciation to cover the investment.

There are many combinations of payments and appreciation that could be offered. The following are a few examples:
  New Purchasers:
    10% Down Payment; 10% from the Fund
    Appreciation split between owner and Fund 40%/60%
    10% Down Payment; 20% from the Fund
    Appreciation split between owner and Fund 20%/80%
    20% Down Payment; 10% from the Fund
    Appreciation split between owner and Fund 45%/55%
  Refinancing Owners:
    20% of appraised value funded through the Fund
    Appreciation split between owner and the Fund: 20%/80%
    10% of appraised value funded through the Fund
    Appreciation split between owner and the Fund 40%/60%

Access of the public to the contracts could be by means of (a) a network of trained mortgage brokers, (b) real estate agents and developers, or (c) directly through the Internet. An origination fee, e.g., 1%, could be paid to a contract provider upon completion of a contract.

Figure 1:
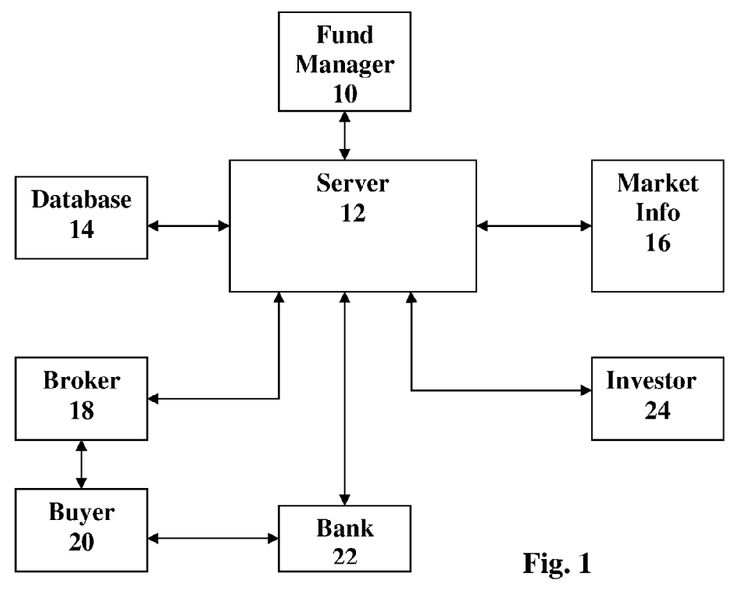
FIG. 1 is a block diagram of an exemplary system for carrying out an embodiment of the present invention.

The Fund is run by a fund management company, which keeps records of the contracts, the status of real estate appreciation in various markets, capital and investors. While with a small number of contracts this can be managed manually on paper, any significant number of contracts will require automation. FIG. 1 shows a fund management company 10 that inputs information about the Fund into a computer server 12. The server stores this information for retrieval in a database 14. Information about real estate market conditions in various geographic markets can be input by the fund management company 10 or it can be obtained manually or automatically over a network, including the Internet, from third party sources 16. This market information is input to the server 12. Application programs on the server 12 can be used to calculate the value of issued contracts on the basis of appreciation information received from sources 16, so the present value of each contract can be known. In addition, terms for proposed new contracts, including the owner/investor appreciation split (e.g., 40/60) can be set by algorithms run by application programs on the server 12 and reported to the fund management company.

Contract terms by geographic market and by price segment within a geographic market are created by the fund management company based on the results of the application programs running on the server 12. These contract terms are posted on the server 12. The sales force for the contracts, e.g., real estate brokers 18, in geographic areas where the fund management company operates, can review the postings electronically from a computer terminal at the Broker's office, e.g., over the Internet, and can offer the contracts to appropriate buyers 20. Where the contract is for a down payment on a new home, such a broker would also work with the buyer in securing a first mortgage on the property from a bank 22. Using its computers, the bank 22 could check the contract terms by accessing the server 12 over the Internet or some other network. Mathematical models determine the owner/investor appreciation split (e.g. 40/60).

The capital for the Fund could come from a single investor. However, more likely the funds of numerous investors 24 would be pooled and managed by the fund management company. This pooling is typically done by traditional investment means. Investors would deposit their committed investments into an escrow account. The funds in the escrow account would be invested in low risk, liquid, interest bearing financial products. All interest net of expenses can either be distributed to the investors or retained in the Fund. The fund management company would not receive a distribution from the interest received on the escrow funds. As property contracts are signed, the escrow account will be drawn down to provide the funding. Although the investment will be diversified by participation in several properties, separate accounting and detailed records will be maintained for each property. Any profits (gains) will be calculated separately for each property and distributed to each investor.

The investor 24 is given access via his own computer terminal and a network, e.g., the Internet, to certain information about the Fund. For example, the investor 24 could access information about the value of his or her investment, market appreciations in the locations where the investor has provided funds for contracts and current contract terms. Depending on the sensitivity of the information, the connections to the server 12 from the broker 18, bank 22 and investor 24 may be over secure networks and protected by passwords and authentication.

When the system has developed to the point where there are numerous contracts, they may be grouped into tranches. An arbitrary number of shares can be assigned to the value of each contract in the tranche and the share allocated to the investors whose capital was used for the contracts. The grouping of contracts could be by geographic area, time period or market price segment. It could also be broadly diversified. It may even be possible to set up traunches that can be used to hedge other traunches.

Figure 2:
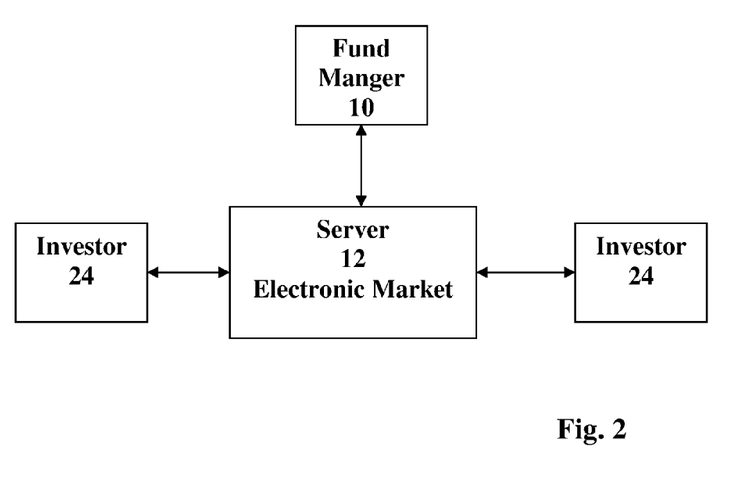
FIG. 2 is a block diagram of an exemplary system for carrying out electronic trading of groups of contracts according to the present invention.

The performance of these tranches of contracts will rise and fall based on the overall real estate market, the appreciation in market in the relevant geographic areas, payment history and credit worthiness of the owner and other factors. As the value of a particular tranche rises or falls, investors may be interested in buying or selling their interests, in particular contracts or tranches of contracts. Thus, an electronic market as shown in FIG. 2 could be established to manage the sale of contracts or tranches. This would provide liquidity to the investment.

In operating the market the fund manager 10 would establish the tranches and post them on the server 12. Using the server 12 as the market, an investor could post his or her shares for sales at an offer price. Other investors could offer to purchase at a certain bid price. Sales would be concluded when the bid and offer prices match. Such transactions would be recorded by the server and administered by the fund manager.

The Fund Manager 10 may form one or more Limited Liability Corporations ("LLC") or similar legal entities that protect investors from any personal liability. Each LLC may be funded by one or a small number of investors. LLC's are Limited Liability Corporations, which. The LLC can then fund a series of properties using funds from each investor in the LLC in proportion to the investor's original investment. Investment may continue until the funds in the LLC have been reduced to the point at which they are insufficient to make an additional investment, at which point the remaining funds can be returned to each investor, again proportional to their original investment. Alternatively, the remaining funds may be invested in interest bearing accounts. Further, additional funds will be acquired by the LLC either from newly admitted investors or as a roll over from expiring contracts owned by the LLC. As new investors apply to the Fund Manger, their funds may be applied to existing LLCs or new LLC's will be formed. The Fund Manager makes sure each investor in an LLC knows the specific properties in which he or she is invested. For example, investors may be provided with access to Server 12 and allowed to see information about the specific properties that they are funding, including visual and financial descriptions of their investment properties. They can also see their individual financial positions on displays at their terminals. As each property is sold or refinanced to terminate the contract, the original investment plus profit is returned to the LLC and can be returned to the investors in LLC or retained for future investment depending on the desires of the investor and/or the management of the LLC.

The fund management company 10 seeks to provide high, long-term capital gain returns by building a portfolio of real estate investments that are mortgaged by their owners and whose appreciation is realized in part by the Fund. In essence the Fund, through a contract, owns a portion of the appreciation of the underlying real estate. In order to realize actual income, at the end of the contract term the property can be either "marked to market" and refinanced by the owner, sold with the Fund receiving its portion of the appreciated value or turned over to the Fund. Although the Fund would most often seek to sell the properties that are turned over to it, depending on market conditions, it may elect to hold on to the property and rent it for monthly income.

Figure 3:
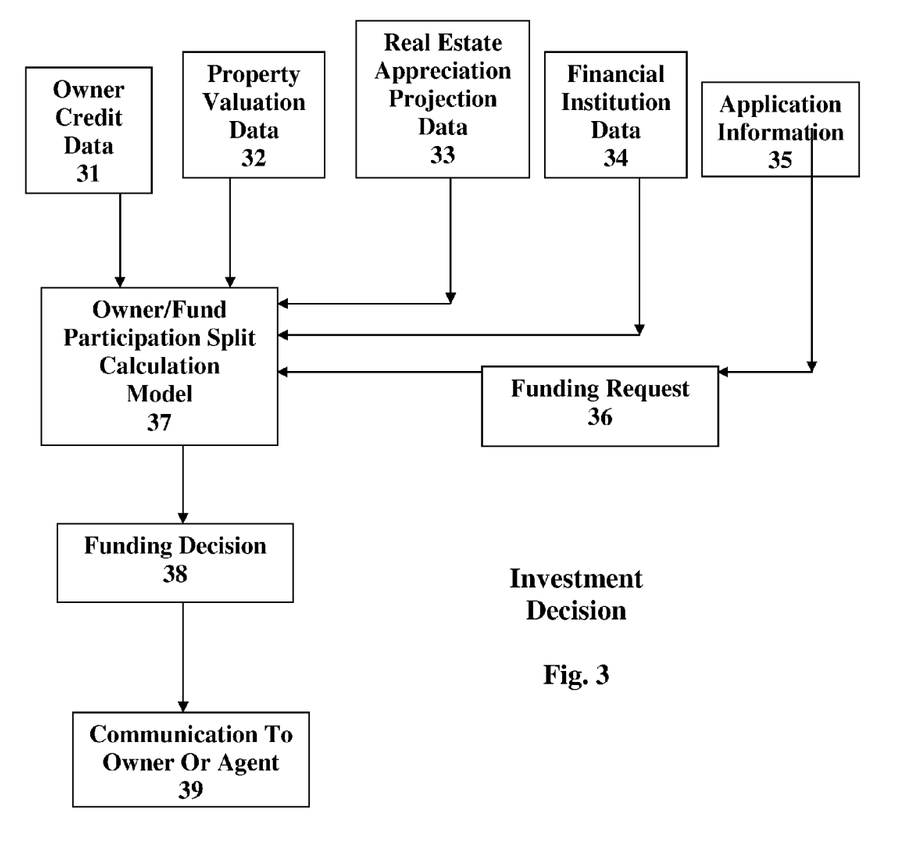
FIG. 3 is a flow chart showing the process of approving a request for funding.

In order to maximize the income to the Fund, the Fund Manager must make good decisions about the properties in which to invest and the terms for each contract covering a piece of property. This process can be somewhat automated as shown in FIG. 3. The factors to be taken into account are the Owner Credit Data 31, Property Valuation Data 32, Real Estate Appreciation Projection Data 33, Financial Institution Data 34, and Application Information 35. The Application Information can be used to formulate a Funding Request 37 which, together with the Owner Credit Data, Property Valuation Data, and Real Estate Appreciation Projection Data can be used to determine the proper Owner/Fund Participation Split 36 by applying an algorithm 37 running on the Server 12. In turn, the Owner/Fund Participation Split can be used to formulate a formal Funding Decision 38, which can then be used for Communication to the Owner or Agent 39.

Figure 4:
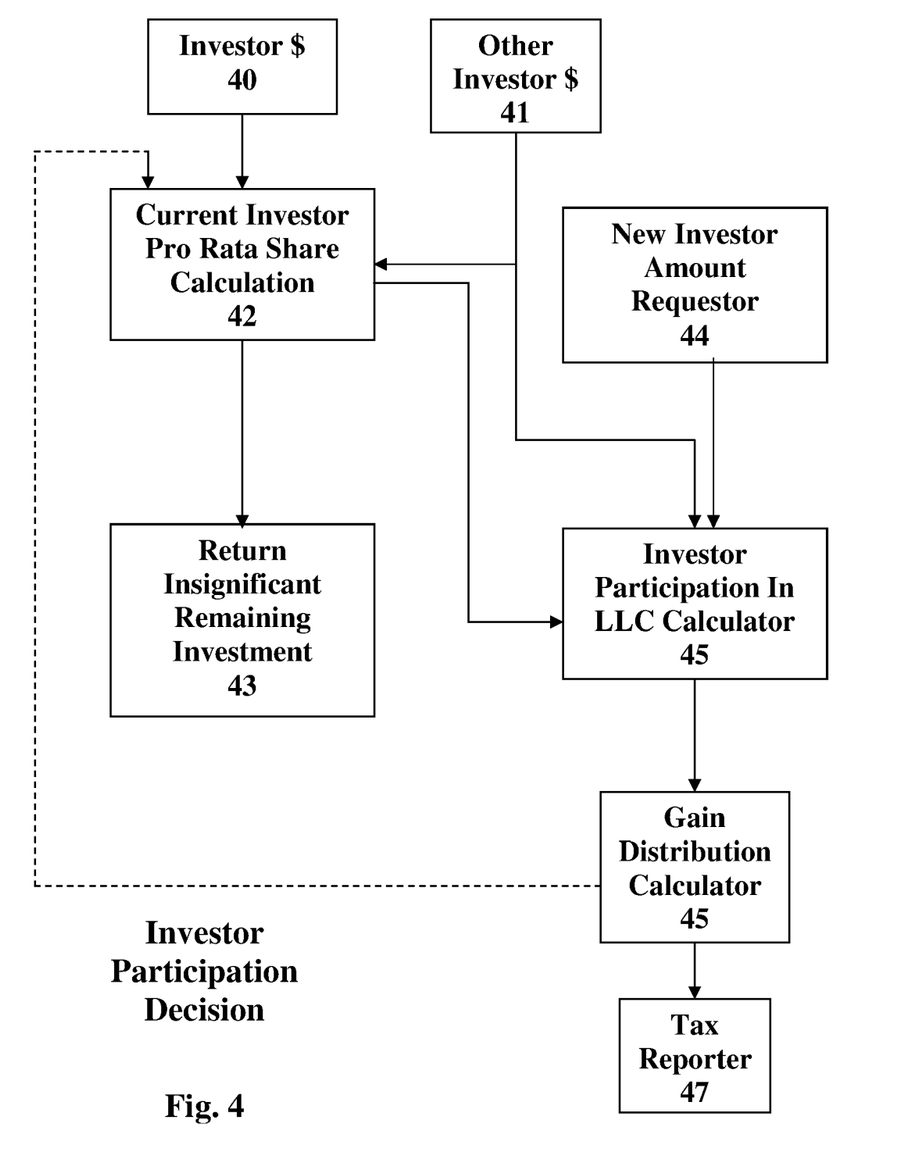
FIG. 4 shows how the investment and return process operates.

When a property is sold or refinanced to terminate the contract, a calculation is typically performed to determine each investor's pro rata share of the proceeds. This calculation is shown in FIG. 4 and can be based on the amount of the investor's original investment 40 compared to other capital in the particular Fund from other original investors 41. This pro rata share calculation 42 continues to be based on the amount of the investor's original investment amount as new funds are added from new investors 44. When the pro rata share calculation determines that an investor's pro rata share is less than 1% of the Fund, that investor's balance can be returned to him 43.

If a new investor adds money to a Fund or LLC 44, the new value of the Fund can be calculated 45. When a gain is realized by the Fund or LLC 46, the investor's share is reported to him as a capital gain and is also reported to taxing authorities 47. The gain can be rolled over into the investor's account, causing a recalculation of the investor's pro rata share 42.

The fund management company 10 can be compensated mainly through the gains generated by the Fund so that its objectives are totally aligned with the objectives of the investors. In particular, the gains in the Fund, after the return of 100% of the original capital, could be distributed 80% to the investors; 20% to the Fund management company with no preference. After the investors have received 20% annualized return on their investment, the remaining gains could be distributed equally between the investors and the management company. Direct expenses of the operation are passed on to the Fund. The Fund may also pay a low annual charge, e.g., 2% of invested funds, to the fund management company for its services.

The design of the Fund provides a magnified return based on real estate price appreciation. The real estate may be single family homes, condos, co-ops or multi-unit buildings. All distributions beyond return of capital are treated as capital gains for the investors.

The Fund may seek to increase its returns by borrowing against its assets to obtain additional capital. This leverage will be non-recourse to the investors and the investors' exposure would be limited to the investment made.

Direct expenses of the Fund may include but are not limited to: payments to mortgage brokers, payments to real estate agents and developers, legal fees, costs associated with the repossession of the property in case of default that are not recovered from the defaulting owner, marketing cost, etc.

In order to protect the assets of the Fund against the risk of owner default, the fund management company may monitor the mortgage and maintenance payment status of the owners. This could be done through electronic access to the owner's payment history and credit status. Such access may be part of the contract or a separate agreement with the bank providing the first mortgage. Under the contract the fund management company may also seek the right to inspect the property periodically, e.g., once per year. The risk of owner default can be reduced through active and diligent monitoring. As a way of providing an incentive for the owner to avoid default, the contract could have a provision that imposes a significant penalty on the owner for late payment on the principal mortgage. For example, each late payment could result in a reduction in the owner's share of the appreciation, e.g., by 1 percentage point. The contract could also provide that in case of default, the Fund will collect its return of capital and its share of appreciation from the bank holding the first mortgage or some other repossessing entity.

Figure 5:
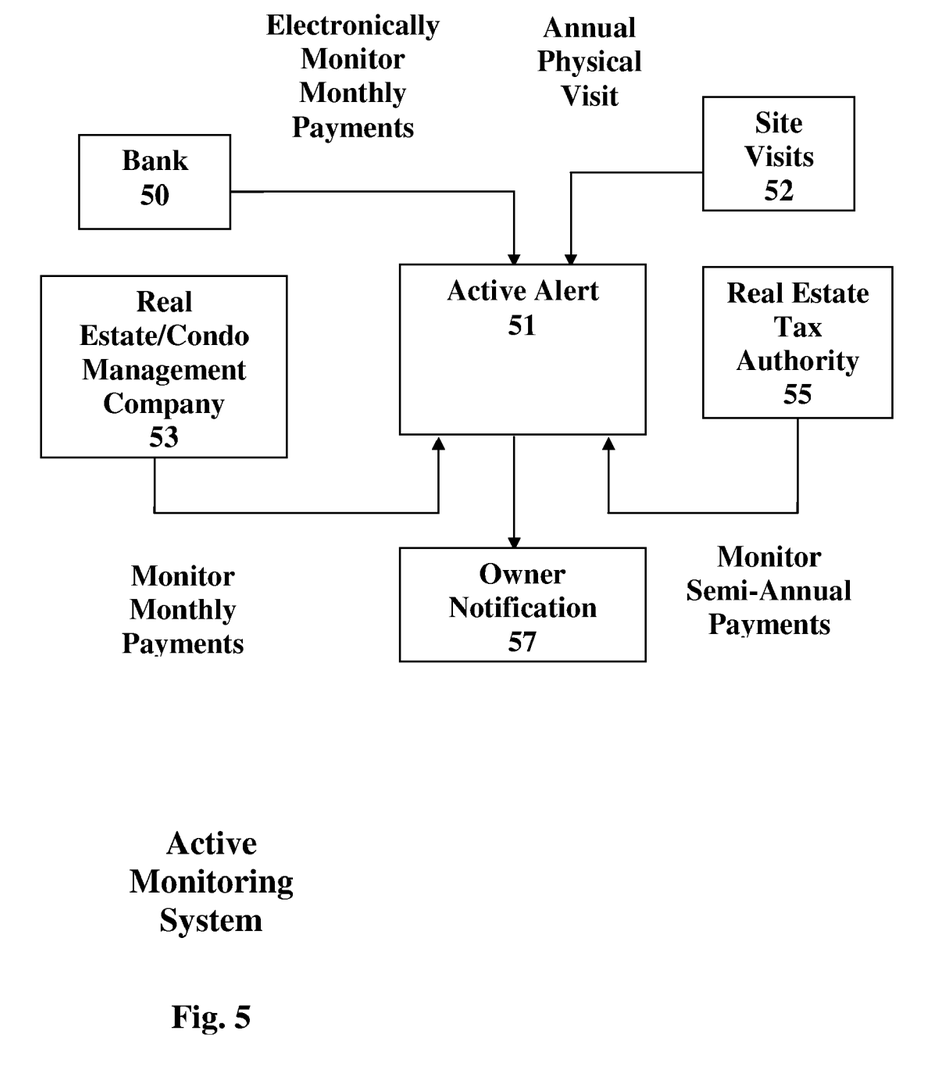
FIG. 5 shows a method of managing the status of the investment in each property.

As part of an active monitoring system as shown in FIG. 5, monthly data can be obtained, electronically, or otherwise, from the appropriate banks and credit reporting agencies 50 to assess any change in the owner's financial status. This data can be analyzed 51, electronically or otherwise. When performed electronically, it can be handled by an application program running on the Server 12. This program can prepare a monthly credit status report for each property.

Each year a visit 52 can be made to each property and an evaluation report prepared. Reports can be also be received from a condominium management company 53 regarding the financial status of the condominium 4, if the property is a condominium. Reports can also be gathered from the appropriate taxing authority 55 as to whether the taxes have been paid on time. This data can be combined 51 to form an integrated view of the credit worthiness of the property. If according to a particular algorithm, there is an increased danger of default, an alert message can be provided to the Fund Manager, who may put the property on a watch list. Also, the manager can have an informal discuss with the property owner to assess the situation. If any of the term of the contract have been violated by the property owner, a formal notification 57 can be sent to the property owner, stipulating required remedial action, including reduction of the owner's share of the property appreciation.

The Fund would also try to protect against declining real estate values. First, it should be appreciated that the Fund would seek to invest in only high quality real estate expected to hold its value in declining real estate markets. Under the contract the Fund investment is subordinated only to the underlying first mortgage and will have preference over the return of capital to the owner. This preferential repayment treatment creates an additional downside "cushion." Further, depending on market conditions the Fund will have the option to purchase a downside hedge to reduce the possibility of potential loss of capital invested. This may protect the assets of the Fund, but will have the effect of reducing the returns.

To guard against the risk of under-market sale by the owner, the contract can provide the Fund with a right of first refusal to purchase the property, whereby the Fund will be able to match the below market sales price and its conditions.

The management company can further protect the Fund by recording the contract as a lien on the property with the Fund being the lien holder. The Fund may obtain an appraisal on an annual basis, mark the property to market and increase the lien amount. This would have no impact on the owner, but simply reflect the current market conditions and results of the Fund's investment. In such case, the Fund will provide the appraised valuation to the owner via the web site, by e-mail or postal mail. The contract can also be worded such that the owner shares in the profit or appreciation only after the Fund has achieved a predetermined annual rate of return, e.g., 9%, from the appreciation.

Investment in the Fund is suited for sophisticated investors who are seeking magnified returns based on appreciation of real estate values, have a long term horizon for this investment, are seeking exposure to a different asset class to diversify their investment portfolio, are seeking a relatively non correlated asset class which at times has even exhibited performance of a negatively correlated asset (as a hedge against declining long term interest rates or declining markets), understand the risks of real estate investment, and do not depend on the gains from this investment for their livelihood.

The Fund is a tax-advantaged investment. As the contract terms expire and the investment is repaid in one investment, it may be rolled over to the next contract under the tax rules. This will defer the capital gains tax as long as there is a similar property in which to invest.

Although the invention has been described and illustrated in detail, it is clearly understood that the description has been by way of example, and is not to be taken by way of limitation. Thus, various changes in form and details may be made therein without departing from the spirit and scope of the invention, which is to be limited only by the terms of the appended claims.

What is claimed is:

1. A method of operating a financial fund to share in an appreciation in a value of real estate in return for a payment by the fund, comprising the steps of:
receiving at a fund server an electronic request from an owner or prospective owner of real estate for the payment;
assessing a credit worthiness of the owner;
if the owner is credit worthy, electronically providing to the owner a non-loan contract between the fund and the owner, the contract being for a fixed period of time and having one or more terms and by which the fund receives only a monetary value of a share of the appreciation in the value of the real estate over the fixed period of time in return for the payment;
executing the non-loan contract with the owner and storing a copy in a database connected with the fund server;
making the agreed payment to the owner for the fixed period of time;
subsequent to entering the non-loan contract, realizing the appreciation in the value of the real estate by converting the non-loan contract into a liquid asset; and
receiving the monetary value of the share of the appreciation from the liquid asset;
wherein the fixed period of time is a limited time frame after which the real estate is at least one of (a) refinanced, (b) sold, and (c) transferred.

2. The method of claim 1 wherein the owner is a prospective purchaser of the real estate and the payment to the owner is for a down payment on the purchase of the real estate.

3. The method of claim 2 wherein the prospective owner is securing a first mortgage on the real estate and the step of assessing the credit worthiness of the owner involves reliance on a credit check conducted by an organization issuing the first mortgage.

4. The method of claim 3 further including the step of monitoring the owner's payment on the first mortgage through electronic access to the owner's payment history and credit status information.

5. The method of claim 4 wherein the credit worthiness of the owner is periodically calculated by an application running on the fund server based on the owner's payment history and credit status information.

6. The method of claim 1 wherein the owner is an existing owner of the real estate and the payment to the owner is for personal use.

7. The method of claim 1 wherein the step of realizing the appreciation in the value of the real estate is achieved by selling the real estate.

8. The method of claim 1 wherein the step of realizing the appreciation in the value of the real estate is achieved by marking the real estate to market and refinancing the real estate.

9. The method of claim 1 wherein a period subsequent to entering the market is fixed in the non-loan contract.

10. The method of claim 1 wherein the share of the appreciation is variable depending on at least the assessment of credit worthiness.

11. The method of claim 1 wherein the fund executes a plurality of contracts with different owners, and further including the steps of grouping the contracts and selling interests in the contract groups to investors.

12. The method of claim 11 wherein information about the plurality of contracts is stored in the fund server database along with information about the interests of the investors in the fund.

13. The method of clam 12 wherein the fund tracks real estate appreciation in various geographical and/or price markets and stores real estate appreciation information in the database.

14. The method of claim 13 wherein the share of the appreciation is variable depending on at least the real estate appreciation information in the geographical and/or price market for the real estate covered by the contract.

15. The method of claim 14 wherein the share is calculated by an algorithm run on the fund server.

16. The method of claim 13 wherein the real estate appreciation information is received by the fund server over the interne.

17. The method of claim 12 wherein individual investors have access to fund information from client computers accessing the fund server over the internet.

18. The method of claim 17 whereby the investors can buy or sell interests in classes of contracts as part of an electronic secondary market, and the fund server keeps track of the transactions and stores them in the database.

19. The method of claim 12 in which an investor's pro rata share in the value received by the fund from a contract is automatically calculated by an application running on the fund server.

20. The method of claim 1 wherein the terms of the non-loan contract are automatically calculated by an application running on the fund server based on the owner's credit, valuation of the real estate, projected real estate appreciation, information from financial institutions issuing first mortgages and information in an application request from the owner.

21. The method of claim 1 further including the step of monitoring condition of the real estate after the payment is made.

22. The method of claim 1, wherein when the value of the real estate declines, the fund's share has a repayment preference over a return of capital to the owner.

23. A system operating a financial fund to share in an appreciation in a value of real estate in return for a payment by the fund, comprising:
    a fund server that receives over a telecommunications network electronic requests generated at client computers from owners or prospective owners of real estate for the payment, said fund server accessing credit information on owners;
    a fund database for storing information received by or generated by the fund server;
    an application running on the fund server for:
        assessing a credit worthiness of the owner based on said credit information,
        providing to a user interface at an owner client computer a non-loan contract between the fund and the owner, the contract being for a fixed period of time and having one or more terms and by which the fund receives only a monetary value of a share of the appreciation in the value of the real estate over the fixed period of time in return for the payment, and
        receiving the monetary value of the share of the appreciation; and
    wherein the fixed period of time is a limited time frame after which the real estate is at least one of (a) refinanced, (b) sold, and (c) transferred.

24. The system of claim 23 wherein the fund server further provides access to the fund database to investors in the fund operating from investor client computers.

25. The system of claim 24 wherein the fund server runs an application that allows investors in the fund to buy and sell interests in the fund.

26. The system of claim 24 wherein the fund server runs an application that allows investors to view their interest in the fund.

27. The system of claim 23, wherein the terms of the non-loan contract are determined by the application based on at least one of: the owner's credit worthiness, a valuation of the real estate, projected real estate appreciation, information from financial institutions issuing first mortgages, and information in an application request from the owner.

28. A method of operating a financial fund to share in an appreciation in a value of real estate in return for a payment by the fund, comprising the steps of:
    receiving at a fund server an electronic request from an owner or prospective owner of real estate for the payment;
    electronically providing to the owner a non-loan contract between the fund and the owner, the contract being for a fixed period of time and having one or more terms and by which the fund receives only a monetary value of a share of the appreciation in the value of the real estate over the fixed period of time in return for the payment;
    executing the non-loan contract with the owner and storing a copy in a database connected with the fund server;
    making the payment to the owner;
    subsequent to entering the non-loan contract, realizing the appreciation in the value of the real estate by converting the non-loan contract into a liquid asset; and
    receiving the monetary value of the share of the appreciation from the liquid asset;
    wherein the fixed period of time is a limited time frame after which the real estate is at least one of (a) refinanced, (b) sold, and (c) transferred.

29. A method of sharing in an appreciation in a value of real estate in return for a payment by a provider, comprising the steps of:
    receiving at a server an electronic request from an owner or prospective owner of real estate for the payment;
    electronically providing to the owner a non-loan contract between the provider and the owner, the contract being for a fixed period of time and having one or more terms and by which the provider receives only a monetary value of a share of the appreciation in the value of the real estate over the fixed period of time in return for the payment;
    executing the non-loan contract with the owner and storing a copy in a database connected with the server;
    making the payment to the owner;
    subsequent to entering the non-loan contract, realizing the appreciation in the value of the real estate by converting the non-loan contract into a liquid asset; and
    receiving the monetary value of the share of the appreciation from the liquid asset;
    wherein the fixed period of time is a limited time frame after which the real estate is at least one of (a) refinanced, (b) sold, and (c) transferred.

* * * * *